United States Patent
Yamaguchi

(10) Patent No.: US 8,402,854 B2
(45) Date of Patent: Mar. 26, 2013

(54) LINEAR ACTUATOR

(75) Inventor: Zentaro Yamaguchi, Takasaki (JP)

(73) Assignee: Mitsuba Corporation, Kiryu-shi (JP)

( * ) Notice: Subject to any disclaimer, the term of this patent is extended or adjusted under 35 U.S.C. 154(b) by 675 days.

(21) Appl. No.: 12/531,568

(22) PCT Filed: Mar. 28, 2008

(86) PCT No.: PCT/JP2008/056029
§ 371 (c)(1), (2), (4) Date: Sep. 16, 2009

(87) PCT Pub. No.: WO2008/120700
PCT Pub. Date: Sep. 10, 2008

(65) Prior Publication Data
US 2010/0107790 A1 May 6, 2010

(30) Foreign Application Priority Data
Mar. 30, 2007 (JP) ................. 2007-092390

(51) Int. Cl.
*F16H 25/20* (2006.01)
(52) U.S. Cl. ........ 74/89.38; 74/89.23; 74/99 R; 74/99 A
(58) Field of Classification Search ........ 74/89.38, 74/89.39, 89.23, 89.26, 89.27, 99 A, 99 R, 74/107; 192/69.82, 93 R, 93 A
See application file for complete search history.

(56) References Cited

U.S. PATENT DOCUMENTS 548,168 A * 10/1895 Abrams ........................ 74/571.1
2,972,467 A * 2/1961 Gilman ....................... 251/129.2

(Continued)

FOREIGN PATENT DOCUMENTS

JP 43-20811 B1 9/1968
JP 52-101708 1/1977

(Continued)

OTHER PUBLICATIONS

International Search Report for International Application No. PCT/JP2008/056029 dated May 1, 2008.

(Continued)

*Primary Examiner* — Troy Chambers
*Assistant Examiner* — Valentin Craciun
(74) *Attorney, Agent, or Firm* — Kratz, Quintos & Hanson, LLP

(57) ABSTRACT

A linear actuator capable of setting a bed to a flat state in emergencies is provided.

A linear actuator 10 contains a shaft 16 with a feed male screw section 17, a worm gear reduction device for transmitting the rotation of a motor 40 to the shaft 16, a nut 19 that is coupled by a screw to the feed male screw section 17 and advances or retreats by the forward rotation of the shaft 16 and advances or retreats by the reverse rotation of the shaft 16, and a moving cylinder 12 that is fixed to the nut 19 and advances and retreats relative to a housing 11, wherein a sub-shaft 52 linking to the worm gear reduction device, an inner race 59 spline-coupled to the sub-shaft 52, an engaging male section 82 and engaging female section 83 for free engaging, provided between a collar 55 of the shaft 16 and the inner race 59, an operating ring 66 fitted to allow free rotation on the outer circumference of the housing 11, and a function ring 72 for converting the rotation of the operating ring 66 to an axial movement and transmitting it to the inner race 59 are installed. The shaft 16 can be freely rotated in emergencies by releasing the engaging between the engaging male section and the engaging female section.

10 Claims, 13 Drawing Sheets

U.S. PATENT DOCUMENTS

| | | | |
|---|---|---|---|
| 3,029,659 A * | 4/1962 | Geyer | 74/409 |
| 3,034,618 A * | 5/1962 | Dotter et al. | 192/217.4 |
| 4,080,844 A * | 3/1978 | Killian | 74/89.38 |
| 4,241,687 A * | 12/1980 | DuBois et al. | 440/63 |
| 4,337,053 A * | 6/1982 | Stevens | 440/87 |
| 4,754,660 A * | 7/1988 | Kobayashi et al. | 74/427 |
| 5,329,657 A * | 7/1994 | Bartley et al. | 5/617 |
| 5,423,097 A * | 6/1995 | Brule et al. | 5/617 |
| 5,444,880 A * | 8/1995 | Weismiller et al. | 5/424 |
| 6,000,076 A * | 12/1999 | Webster et al. | 5/618 |
| 7,047,834 B2 * | 5/2006 | Nielsen et al. | 74/89.38 |
| 7,055,195 B2 * | 6/2006 | Roussy | 5/616 |
| 7,594,450 B2 * | 9/2009 | Wu et al. | 74/89.38 |
| 8,024,987 B2 * | 9/2011 | Yamaguchi et al. | 74/89.23 |
| 2004/0093969 A1 * | 5/2004 | Nielsen | 74/89.23 |
| 2005/0283914 A1 * | 12/2005 | Roussy | 5/616 |
| 2008/0210029 A1 * | 9/2008 | Wang | 74/89.38 |

FOREIGN PATENT DOCUMENTS

| | | |
|---|---|---|
| JP | 2000-253618 | 9/2000 |
| JP | 2003-52762 A1 | 2/2003 |
| JP | 2006-272983 A1 | 10/2006 |

OTHER PUBLICATIONS

U.S. Appl. No. 11/992,601.

* cited by examiner

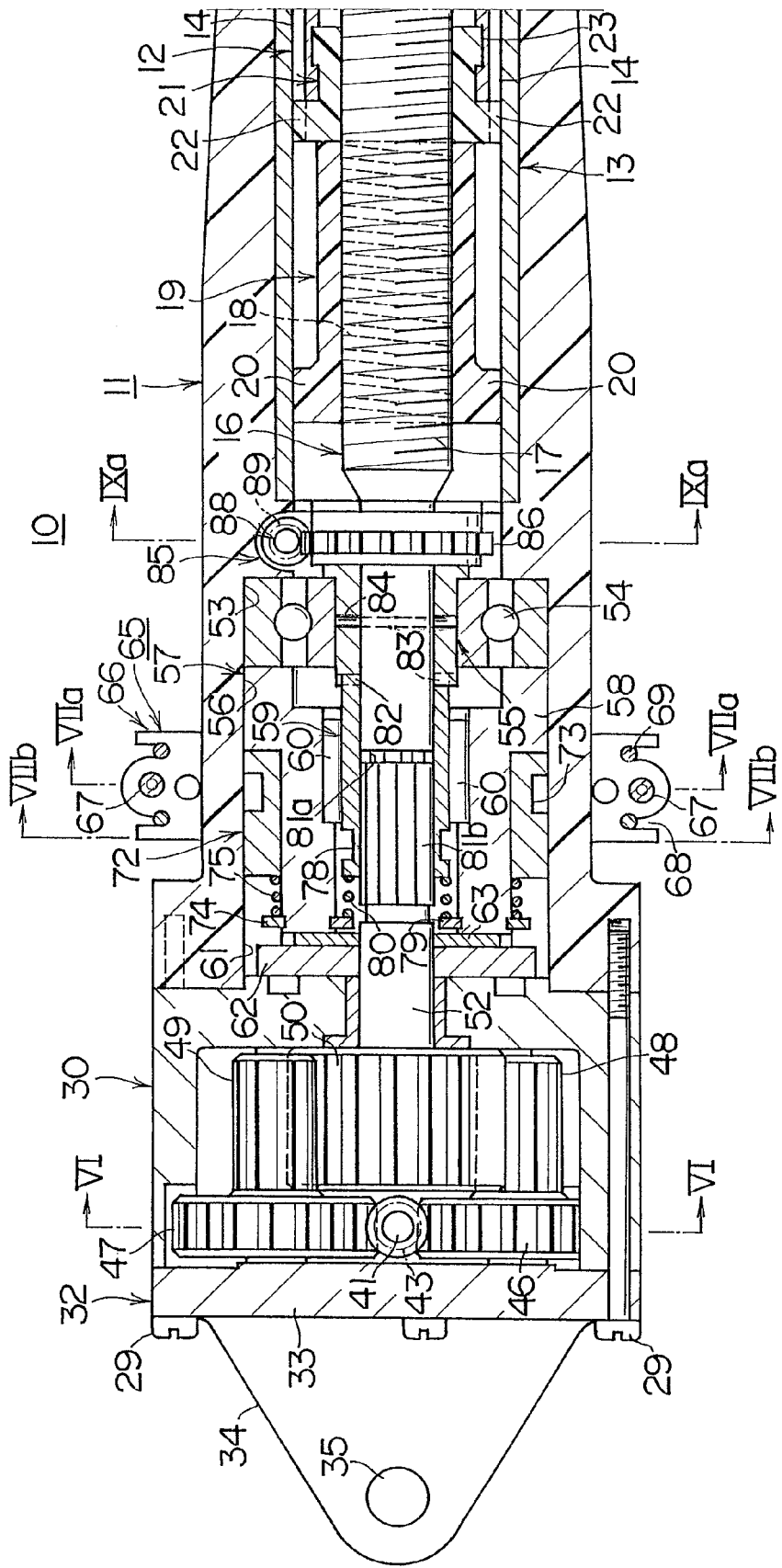

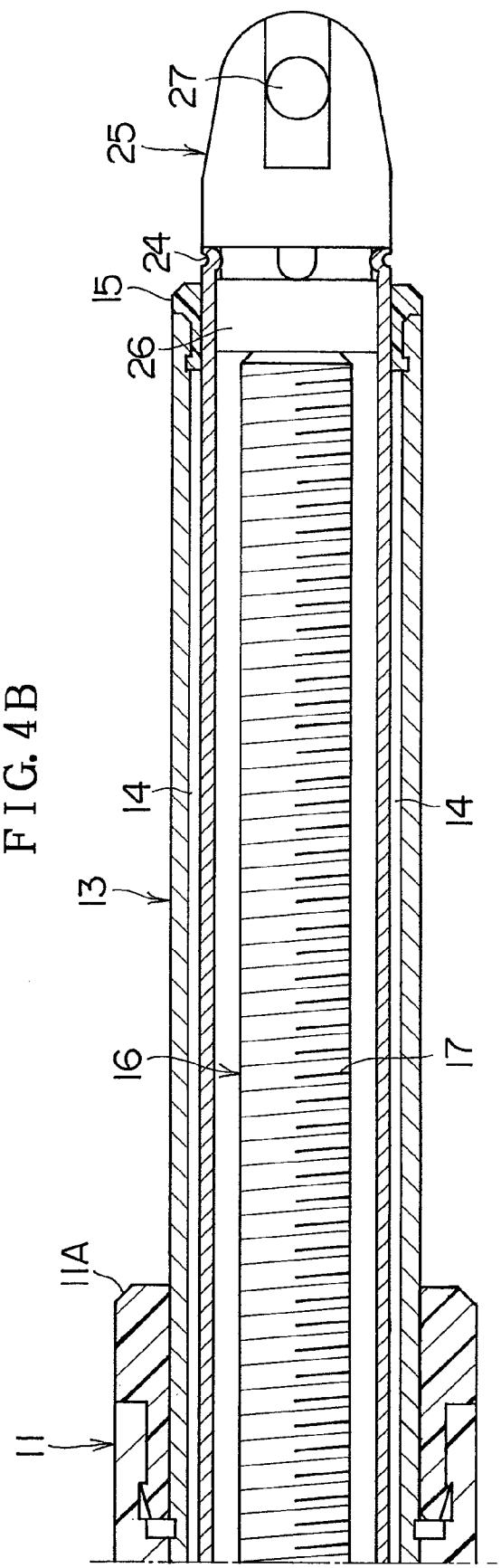

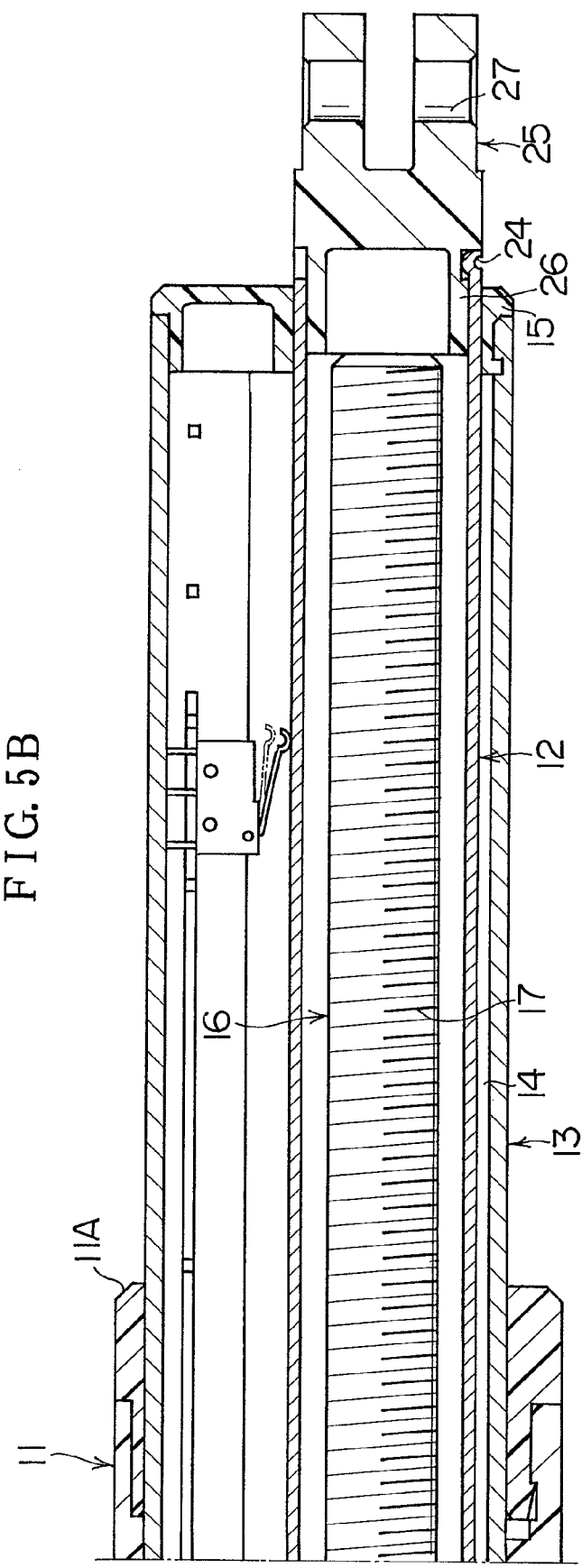

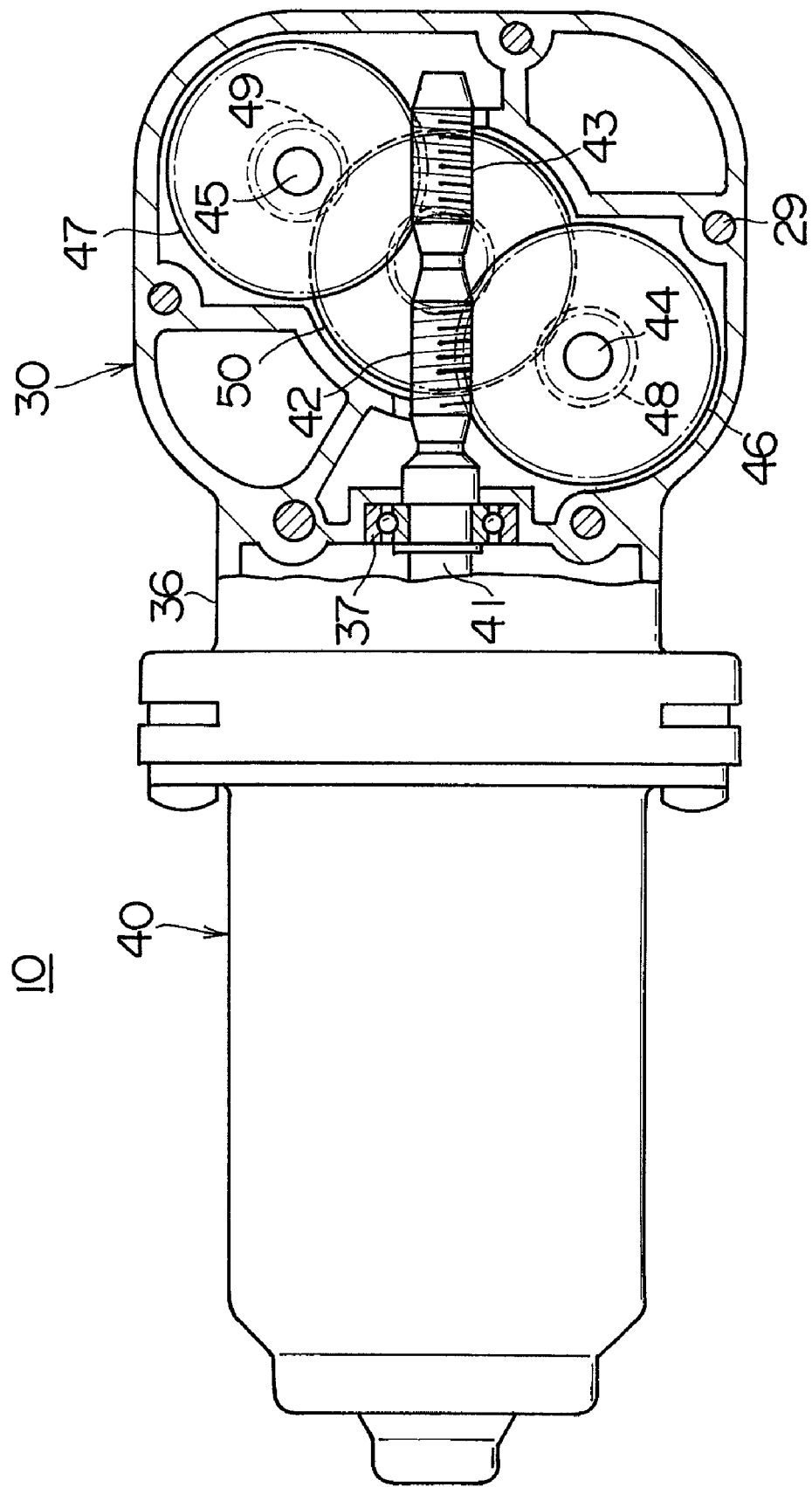

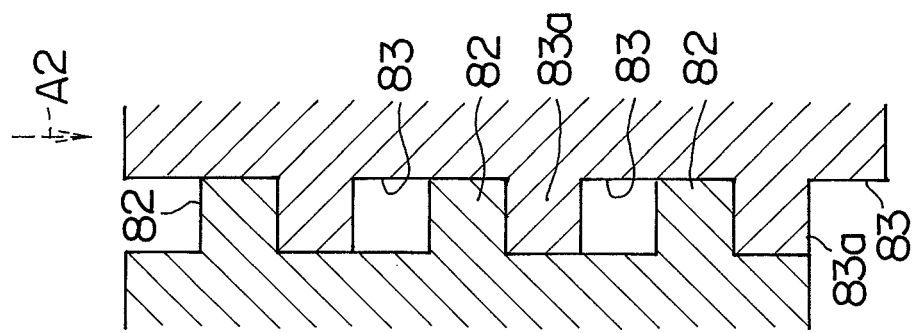
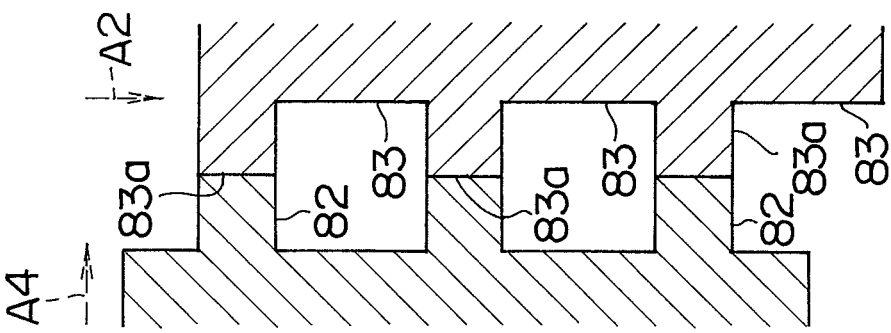
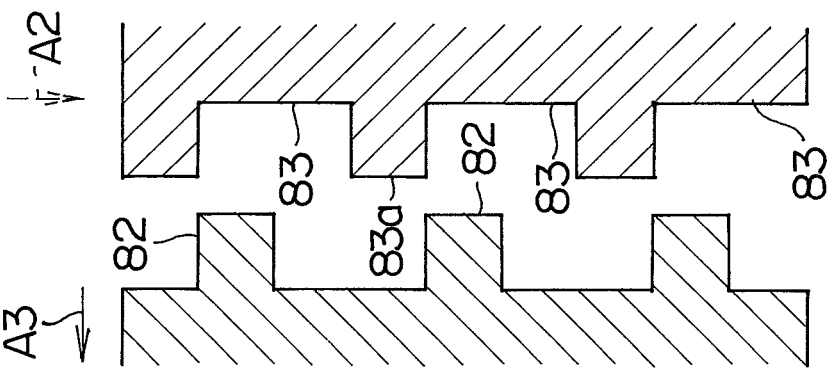
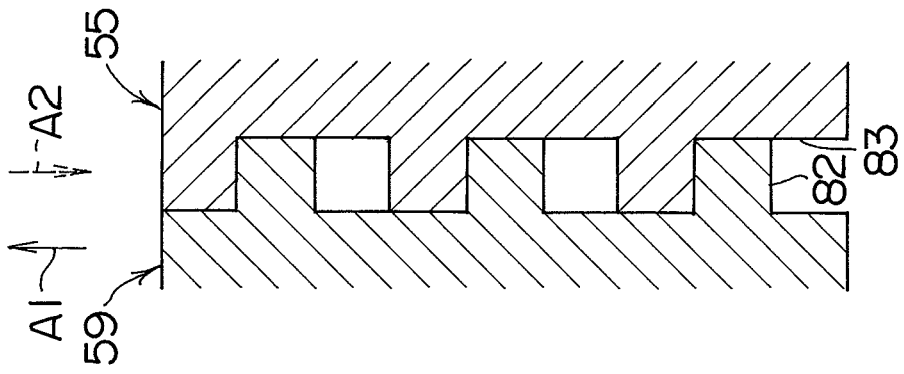

LINEAR ACTUATOR

TECHNICAL FIELD

The present invention relates to a linear actuator and relates in particular to for example, electrical feed-screw type linear actuators effective for use in raising and lowering beds or tilting the back section or knee section of beds for nursing or medical treatment.

BACKGROUND ART

Electrical feed-screw type linear actuators for sick beds/nursing beds raise and lower the bed or tilt the back section or knee section of the bed in order to lower the burden on patients living daily.

The sick bed/nursing bed is sometimes equipped with equipment called a CPR mechanism. The CPR mechanism is a device for making the bed return to a flat state in emergencies such as requiring cardio-pulmonary resuscitation operations.

This CPR mechanism must operate quickly and reliably whatever the circumstances, and must not restrict the operations of the linear actuator in a normal use of bed.

In this type of nursing beds equipped with a CPR mechanism, a cable joins an operating lever installed on the rear side of the back recliner plate to a release lever for canceling the operation of the anti-reverse mechanism in the linear actuator, and the release lever can be easily rotated in the release direction by gripping the operating lever and temporarily raising the back recliner plate in order to release the load acting on the anti-reverse mechanism (Refer to the patent document 1).

Linear actuators including CPR mechanisms include mechanisms where pushing the operating rod of a one-way clutch by the operating lever forces the one-way clutch to disengage (Refer to the patent document 2).

Patent document 1: Japanese patent Non-Examined Publication No. 2003-52762
Patent document 2: Japanese patent Non-Examined Publication No. 2000-253618

DISCLOSURE OF INVENTION

Problems to be Solved by the Invention

However, the above-mentioned nursing beds and linear actuators possess the problem that the bed unintentionally goes to a horizontal position because the one-way clutch or anti-reverse mechanism is easily released when an external force is mistakenly applied to the wire or operating lever.

An object of the present invention is to provide a linear actuator that can prevent the bed from unintentionally moving to the horizontal position.

Another object of the present invention is to provide a linear actuator capable of transmitting the operating force from a minimum distance via wires or rods from the side of the bed when the CPR mechanism is operated.

Means for Solving the Problems

A linear actuator of the present invention includes a housing supporting a freely rotating shaft with a male screw section, a female screw member that is coupled by a screw to the male screw section and advances or retreats by the forward rotation of the shaft and advances or retreats by the reverse rotation of the shaft, a moving cylinder that is fixed to the female screw member and advances and retreats relative to the housing, an input shaft for transmitting the rotation of a motor to the shaft, a clutch for engaging and disengaging the input shaft with the shaft, an operating ring fitted to allow free rotation on an outer circumference of the housing, and a function ring to convert the rotation of the operating ring to an axial movement and transmit that movement to the clutch.

Effect of Invention

The above aspect of the invention renders the effect that the bed can be prevented from unintentionally going to a horizontal state because the clutch cannot be easily disengaged even if an external force is applied to the operating lever or wire by mistake, because a structure is utilized where the function ring converts the rotation of the operating ring to a linear motion, and the clutch disengages the shaft with the input shaft.

The reliability can also be improved and the cost reduced since an external force on the operating lever actuates wires or rods to release the engaged clutch without requiring a complicated routing structure.

BRIEF DESCRIPTION OF DRAWINGS

FIG. 1A shows the state where placed flat; FIG. 1B shows the state where placed erect;

FIG. 4A is a frontal cross sectional view showing the base end section;

FIG. 4B is a frontal cross sectional view showing the tip section;

FIG. 5B is a plan cross sectional view showing the tip section;

FIG. 6 is a side cross sectional view taken along the line VI-VI of FIG. 4A;

FIG. 10A is a side cross sectional view equivalent to FIG. 7B; FIG. 10B is a frontal cross sectional view equivalent to FIG. 4A;

FIGS. 11A, 11B, 11C and 11D are respectively developmental drawings for describing the engaging and disengaging operation of the engaging male section and engaging female section.

BEST MODE FOR CARRYING OUT THE INVENTION

Figure 1A:
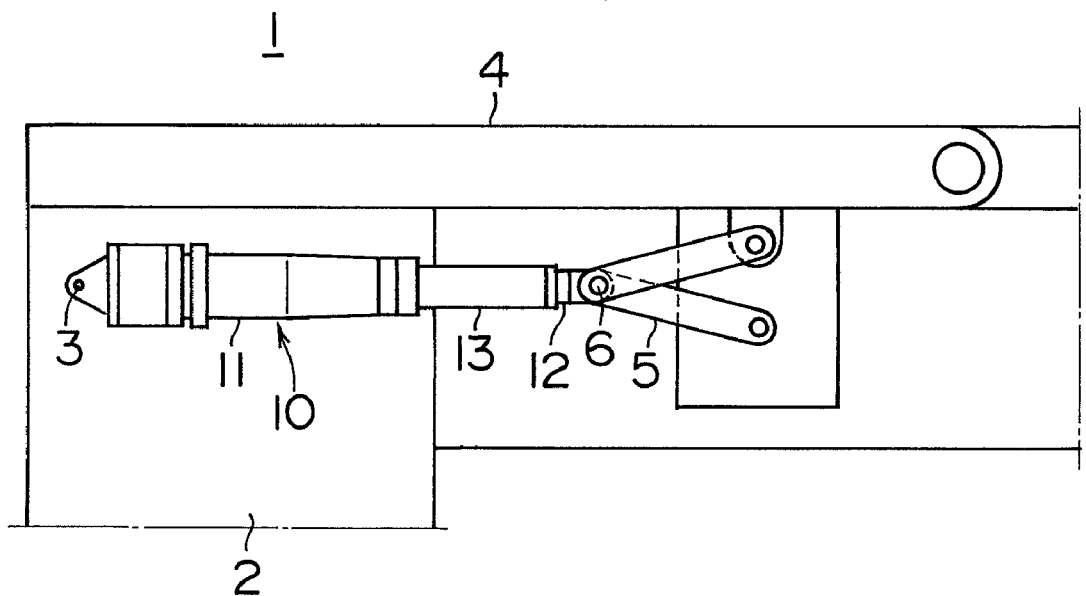
FIGS. 1A and 1B are frontal views showing an essential section of the sick bed/nursing bed using the linear actuator of an embodiment of this invention.

An embodiment of the present invention is described next while referring to the drawings.

Figure 1B:
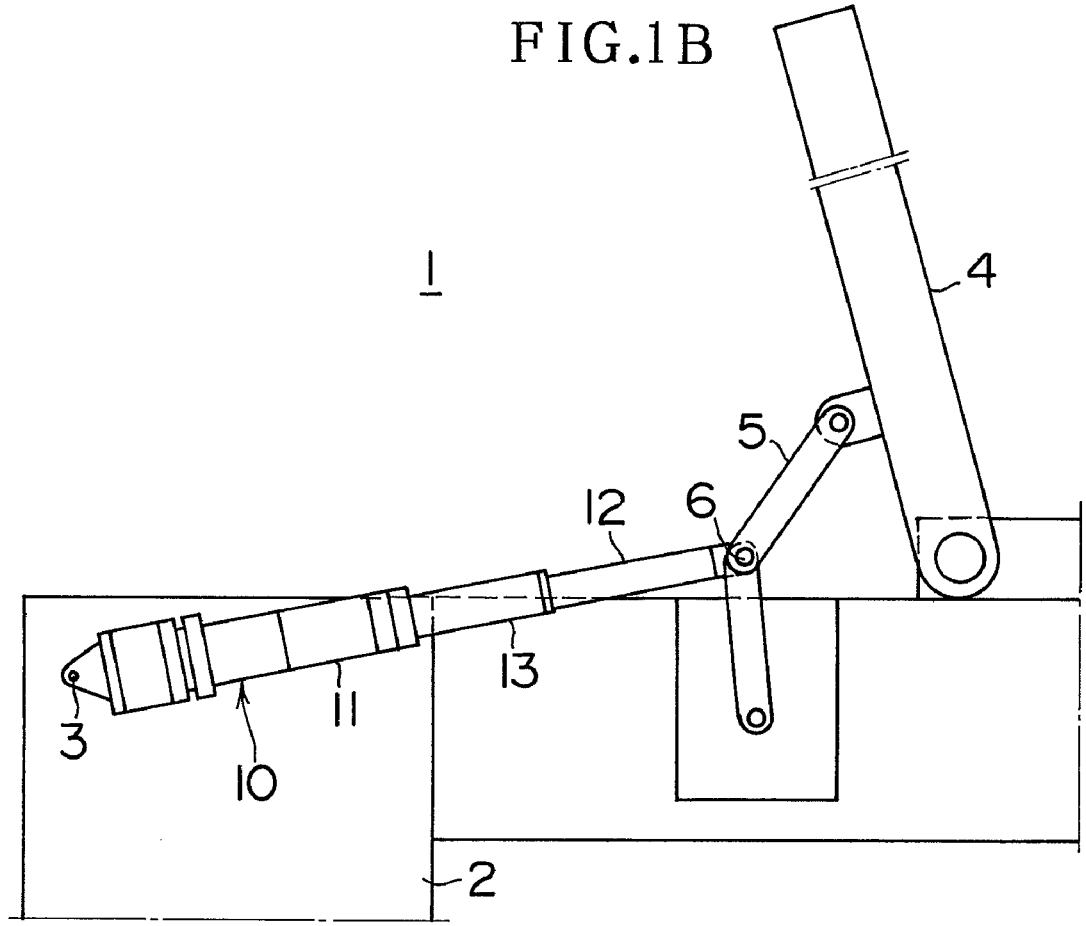

As shown in FIGS. 1A and 1B, the linear actuator of this embodiment is structured to raise and fall the back section of the sick bed/nursing bed (hereinafter called, bed).

Figure 2:
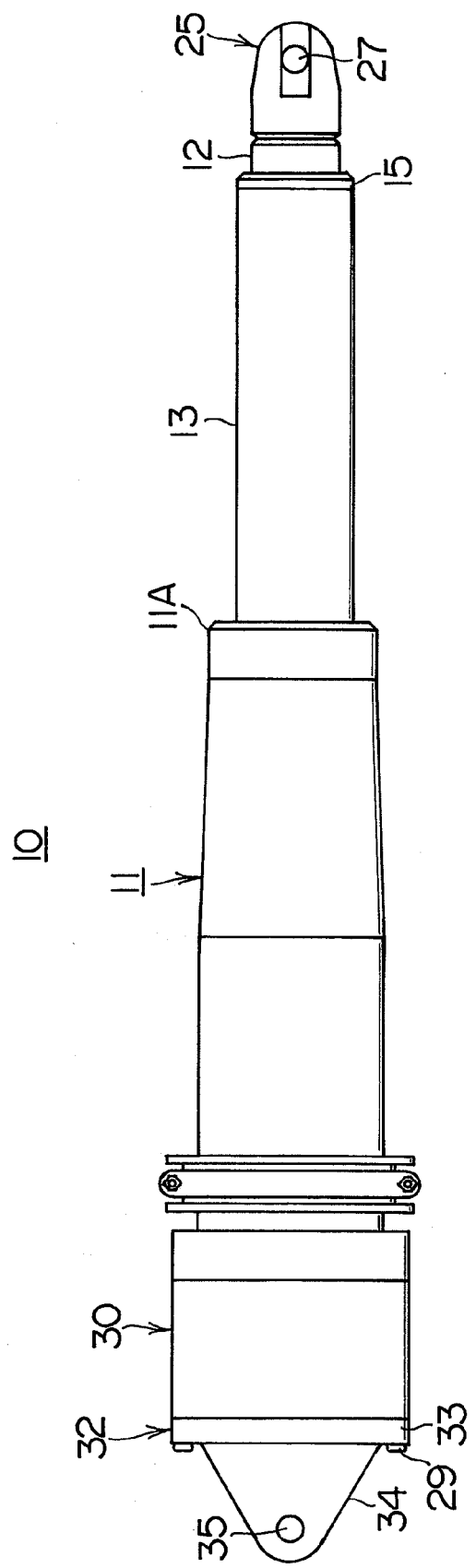
FIG. 2 is a frontal view showing the linear actuator of an embodiment of this invention.
Figure 3:
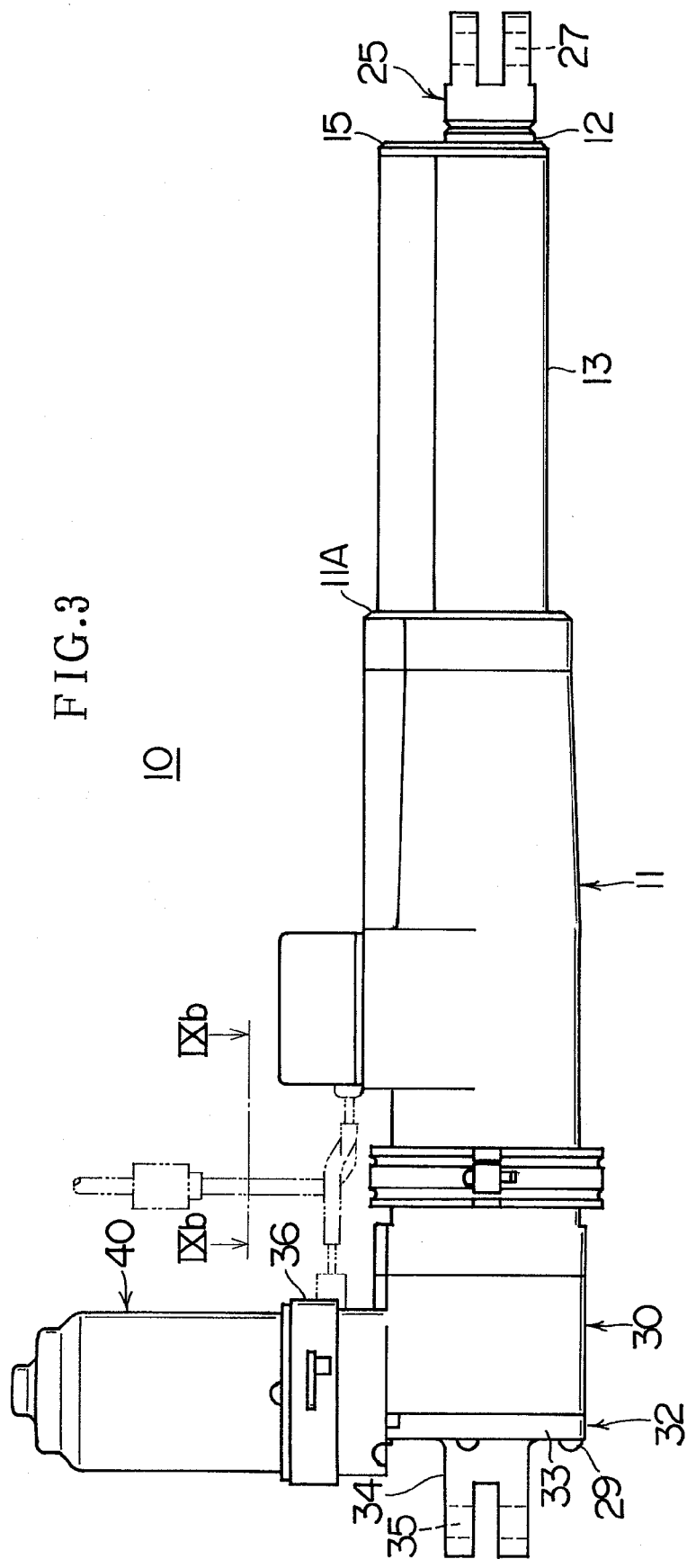
FIG. 3 is a plan view.

In other words, as shown in FIG. 2 and FIG. 3, a linear actuator 10 contains a housing 11, and a moving cylinder 12 that advances and retreats relative to the housing 11. The housing 11 on the fixed end side of the linear actuator 10 as shown in FIGS. 1A and 1B, is pivotally supported to allow free rotation by way of a pivot 3 on a frame 2 of a bed 1. The tip of the moving cylinder 12 on the free end side of the linear actuator 10 is connected to allow free rotation by way of a pivot 6 on a link 5 to raise and fall the back section 4 of the bed (hereinafter called the bed-back).

In a state as shown in FIG. 1A where the moving cylinder 12 of the linear actuator 10 has contracted, the bed-back 4 is laid horizontally, and the bed-back 4 is raised as shown in FIG. 1B, when the moving cylinder 12 of the linear actuator 10 extends.

The housing 11 of the linear actuator 10 as shown in FIG. 2 through FIG. 5B is made of plastic and formed in an approximately cylindrical shape. One end of a support cylinder 13 fits into and is supported on one end (hereinafter called the tip) of the housing 11 as shown in FIGS. 4A and 4B and FIGS. 5A and 5B. The support cylinder 13 is formed in a round pipe shape and has an outer diameter equivalent to the inner diameter of the housing 11. A plug 11A is fitted into the tip opening of the housing 11.

A pair of anti-rotation means 14 for stopping the rotation of the female screw member are formed respectively across approximately the total length on the inner circumferential surface of the support cylinder 13. Both of the anti-rotation means 14, 14 are respectively formed in a narrow key shape with a specified height and width along the axis.

A plug 15 formed in a cylindrical shape including a brim on the outer circumference, is fitted into the tip opening of the support cylinder 13 as shown in FIG. 4B and FIG. 5B.

A shaft 16 is installed in the cylindrical center of the support cylinder 13. A feed male screw section 17 is formed on the outer circumference of an area corresponding to the support cylinder 13 on the shaft 16. A nut 19 serving as a female screw member with a female screw section 18 coupled on the feed male screw section 17 is connected to advance and retreat on the feed male screw section 17.

A pair of anti-rotation means 20 are formed respectively in a key groove shape on the outer circumferential section of the base end of the nut 19. Both of the anti-rotation means 20, 20 are respectively fitted to slide axially on the pair of anti-rotation means 14, 14 on the inner circumferential surface of the support cylinder 13. The nut 19 can therefore slide axially in a state where the rotation is stopped by the anti-rotation means 14 and 20 in the support cylinder 13.

A slider 21 is fitted to allow free sliding movement at the flank on the tip side of the nut 19 on the outer circumference of the shaft 16. The base surface of the slider 21 is abutted against the tip surface of the nut 19. In other words, the slider 21 is basically slaved to the forward and reverse movement of the nut 19.

A pair of anti-rotation means 22 are formed respectively in a key groove shape on the outer circumference of the base end of the slider 21. Both of these anti-rotation means 22, 22 are respectively fitted to slide axially on the pair of anti-rotation means 14, 14 on the inner circumferential surface of the support cylinder 13. The slider 21 can therefore slide axially in a state where the rotation is stopped by the anti-rotation means 14, 22 in the support cylinder 13.

The base end of the moving cylinder 12 is fitted on the outer circumference on the tip of the slider 21. A clamp 23 clamps the moving cylinder 12 on the slider 21. The moving cylinder 12 is formed in a round pipe shape longer than the support cylinder 13.

The tip of the moving cylinder 12 protrudes forwards from the plug 15 fitted on the support cylinder 13. The intermediate section of the moving cylinder 12 is supported by the plug 15 to allow free sliding.

As shown in FIG. 4B and FIG. 5B, a base end section 26 of a coupling piece 25 for connecting the moving cylinder 12 to the link 5 of the bed 1, is fitted onto the tip of the moving cylinder 12. This coupling piece 25 is clamped to the moving cylinder 12 by a caulked piece 24 formed in the tip opening of the moving cylinder 12.

An installation hole 27 is formed in the tip of the coupling piece 25. The pivot 6 is inserted in the installation hole 27 in order to couple the moving cylinder 12 to the link 5.

As shown in FIG. 2 through FIG. 6, the end surface on the base end side of the housing 11 is in contact with a sub-housing 30. The sub-housing 30 has an outer diameter of the same size as the outer diameter of the housing 11 and is formed in a roughly square and tubular shape that is open on the end surface opposite to the housing 11. That opening is covered by a sealing section 33 of a coupling piece 32 for connecting the housing 11 to the frame 2 of the bed 1. The sealing section 33 of the coupling piece 32 and the sub-housing 30 are tightened together onto the housing 11 by multiple screws 29.

A bracket 34 is affixed protruding on the outer side end surface of the coupling piece 32. An installation hole 35 is formed in the bracket 34. Inserting the pivot 3 into the installation hole 35 joins the base end of the linear actuator 10 to the frame 2.

Figure 5A:
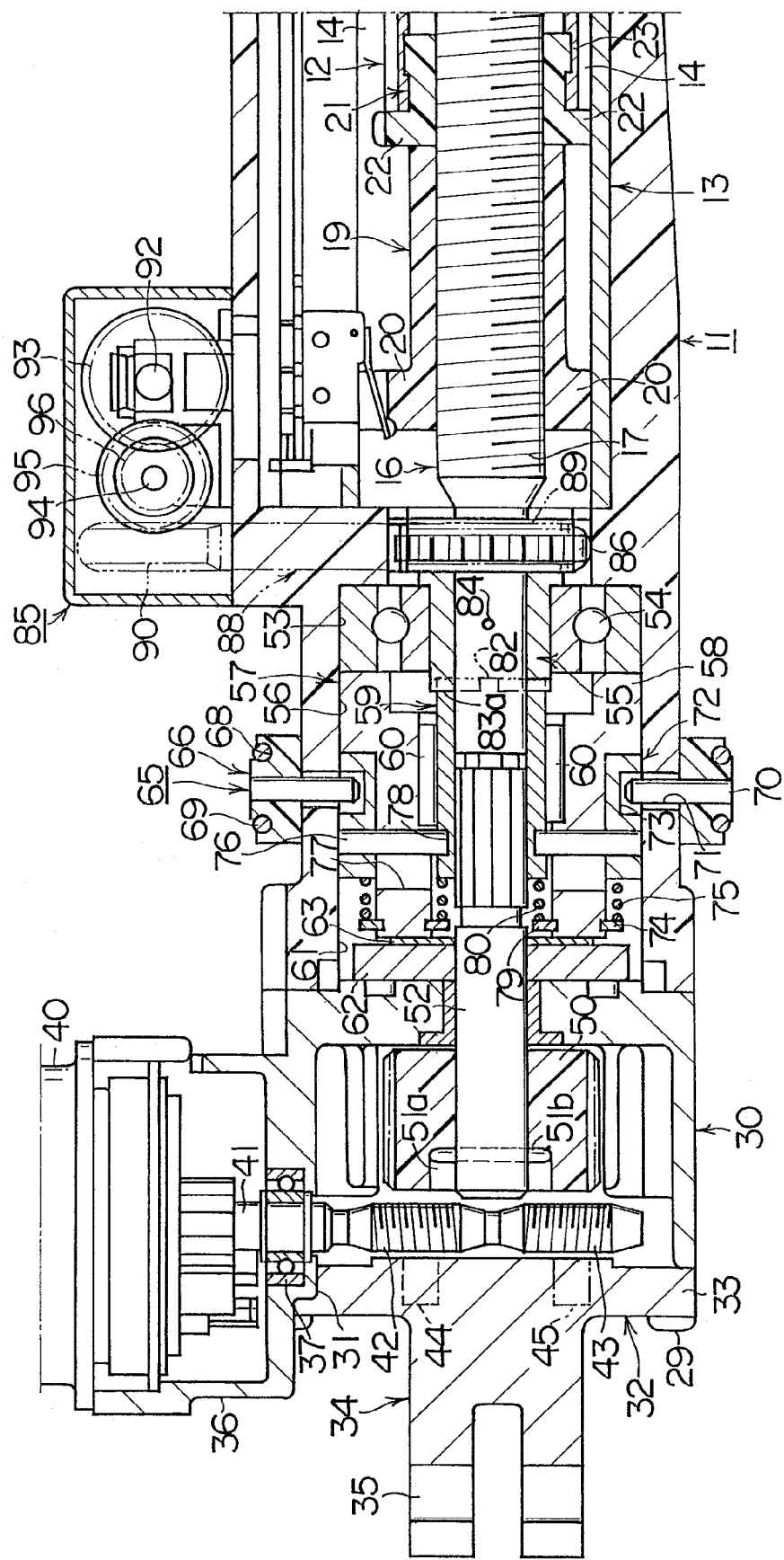
FIG. 5A is a plan cross sectional view showing the base end section.
Figure 7A:
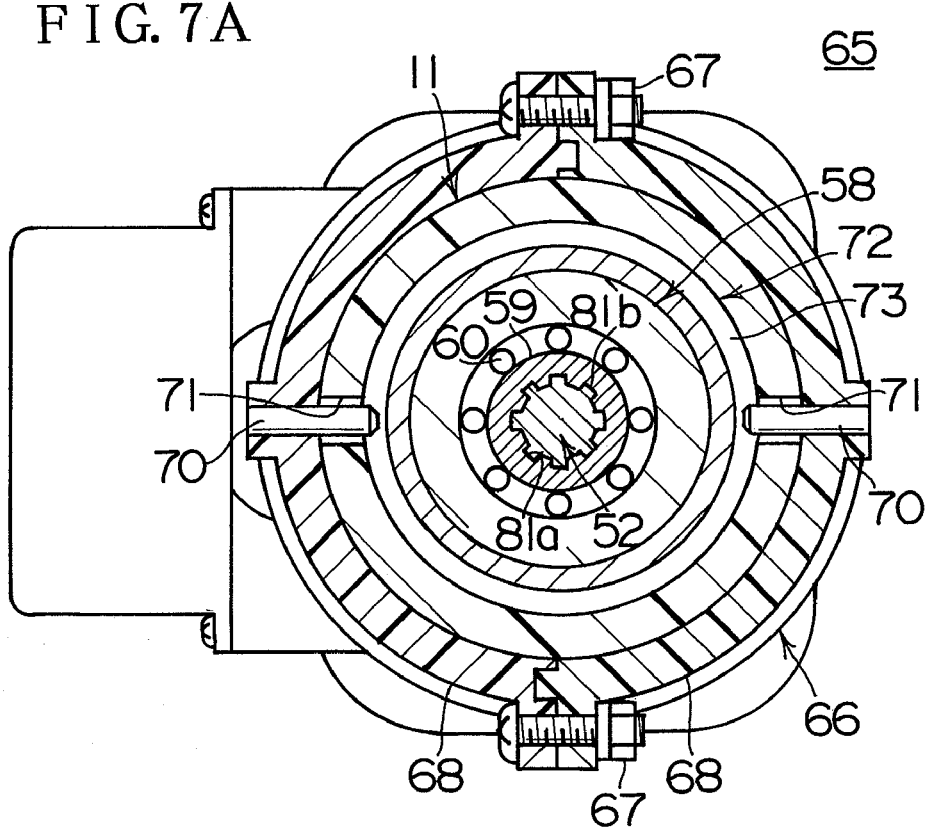
FIG. 7A is a side cross sectional view taken along the line VIIa-VIIa of FIG. 4A.
Figure 7B:
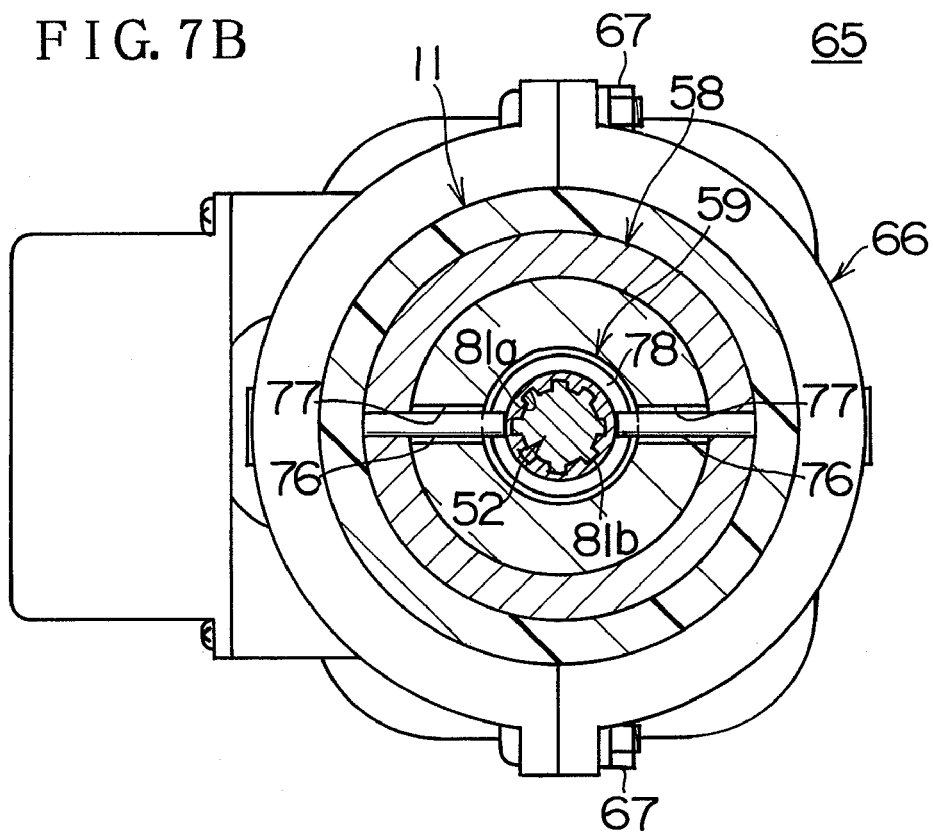
FIG. 7B is a side cross sectional view taken along the line VIIb-VIIb of FIG. 4A.

As shown in FIG. 3, FIG. 5A, and FIG. 6, a motor mount section 36 is affixed to protrude at a position perpendicular to an opening 31 on the sub-housing 30. A motor 40 is installed in the motor mount section 36 and disposed so that a rotating shaft 41 intersects perpendicular to the center line of the sub-housing 30. One end of the rotating shaft 41 of the motor 40 is inserted into the interior of the sub-housing 30. The mid section of the rotating shaft 41 is supported to allow free rotation by a ball bearing 37 mounted in the motor mount section 36.

A pair of worms (hereinafter, sometimes called the right-turn worm and the left-turn worm) 42, 43 possessing turn towards mutually opposite sides are respectively formed in an integrated piece on the outer circumference of a section inserted within the sub-housing 30 on the rotating shaft 41. A pair of support shafts 44, 45 are respectively installed parallel to the center line direction of the sub-housing 30 at positions on mutually opposite sides of the rotating shaft 41 and positions respectively facing both the worms 42, 43 in the sub-housing 30.

A pair of worm wheels 46, 47 are respectively fitted on the support shafts 44, 45 and supported to allow free rotation. Both the worm wheels 46, 47 respectively engage with the right-turn worm 42 and the left-turn worm 43. Intermediate gears 48, 49 are each installed as an integrated piece on the worm wheels 46, 47 with the axial centers aligned. Both these intermediate gears 48, 49 respectively engage with the same drive gear 50.

As shown in FIG. 5A, the drive gear 50 is coupled by a slide key coupling on a sub-shaft 52 extending from the sub-housing 30 to the housing 11 to slide freely along the axis and to rotate as an integrated piece.

The sub-shaft 52 is in other words, supported to allow free rotation in the sub-housing 30 on a line extending along the shaft 16. The drive gear 50 is fitted on the outer circumference of one end of the sub-shaft 52 in the interior of the sub-housing 30. A key groove 51a is formed on one end surface of the drive gear 50, and a key 51b is provided on the sub-shaft 52. The key groove 51a and the key 51b are coupled as a slide key.

Coupling the drive gear 50 in this way with the sub-shaft 52 for rotating as an integrated piece and sliding freely along the axis of the sub-shaft 52 can prevent the axial (direction of thrust) load (force) applied to the sub-shaft 52 from being transmitted to the drive gear 50.

This drive gear 50 may also be formed as one piece integrated with the sub-shaft 52.

A bearing mount section 53 is formed on the section adjacent to the sub-housing 30 of the housing 11 as shown in FIG. 4A and FIG. 5A. A deep groove ball bearing 54 is mounted in the bearing mount section 53. The inner race of this deep groove ball bearing 54 is fitted by way of a collar 55 on the outer circumference of the base end section of the shaft 16. This deep groove ball bearing 54 supports the base end of the shaft 16 to allow free rotation.

The deep groove ball bearing 54 is set to a large size that allows it to support not only the radial load of the shaft 16 but also the thrust load of the shaft 16. The bearing mount section 53 has a structure that allows sliding of the outer circumferential surface of the outer race of the deep groove ball bearing 54.

Utilizing a structure in this way, where the radial roll bearing utilizes the deep groove ball bearing 54 set to a large size for supporting the shaft 16 to allow free rotation, and set to provide a sliding action on the outer circumferential surface, allows eliminating a thrust bearing needed to bear the thrust load of the shaft 16.

A one-way clutch mount section 56 is formed consecutively with the bearing mount section 53 on a section adjacent to the bearing mount section 53 of the housing 11. A one-way clutch 57 is installed in the one-way clutch mount section 56.

The one-way clutch 57 contains an outer race 58, an inner race 59 and multiple rollers 60 disposed to allow free rolling between the outer race 58 and the inner race 59. The roller 60 bites in as a wedge shape between the inner circumferential surface of the outer race 58 and the outer circumferential surface of the inner race 59 to connect the outer race 58 with the shaft 16 during rotation of the shaft 16 in one direction.

The outer race 58 of the one-way clutch 57 is in contact only with the outer race of the deep groove ball bearing 54.

A brake plate mount section 61 is formed on the section adjacent to the sub-housing 30 of the housing 11. A base plate 62 is installed on this brake plate mount section 61.

The base plate 62 is formed in roughly a circular ring shape, and fits on the outer circumference of the sub-shaft 52. A pair of engaging portions provided so as to protrude on the end surface of the sub-housing 30 side on the base plate 62 engage with the engaging holes on the opposing surface of the sub-housing 30 so that the rotation of the base plate 62 is stopped.

A brake plate 63 is formed in roughly a circular ring shape with a diameter smaller than the base plate 62. The brake plate 63 is fitted on the outer race 58 of the one-way clutch 57 and the rotation is stopped. The mated surfaces of the brake plate 63 and the base plate 62 form a braking surface.

In this embodiment, a CPR mechanism 65 is installed between the shaft 16 and the sub-shaft 52 serving as an input shaft for transmitting the rotation of the motor 40 to the shaft 16. The CPR mechanism 65 includes a clutch structure for engaging the sub-shaft 52 with the shaft 16 during normal use of the bed 1 and for disengaging the sub-shaft 52 with the shaft 16 in emergencies such as when performing cardiac-pulmonary resuscitation.

As shown in FIG. 4A, FIG. 5A, FIG. 7A, FIG. 7B and FIG. 8, the CPR mechanism 65 contains an operating ring 66. The operating ring 66 is formed in a circular ring shape, and fits on the outer circumference of the housing 11. The operating ring 66 is split into two along the radius, and is fitted to slide freely along the periphery on the outer circumference of the housing 11 in a state where assembled in a circular ring shape by a set of two pairs of clamping jigs 67, 67.

A pair of ring grooves 68, 68 are mutually formed in parallel on the outer circumference of the operating ring 66. One ends of a pair of control wires 69, 69 are respectively wound and anchored on both the ring grooves 68, 68.

The other ends of the pair of control wires 69, 69 are respectively disposed on both the left and right sides of the bed 1, and are respectively anchored to the operating levers (not shown in drawing) installed on the left and right of the bed 1. The operating ring 66 can therefore fall the bed 1 to a flat position by pulling the other end of the left or right control wires 69, 69 with the operating lever at either the left side or right side of the bed 1 in emergencies.

A pair of parallel pins 70, 70 are installed to respectively protrude inward along the radius at positions separated mutually 180 degrees towards the periphery on the inner circumference of the operating ring 66. The pair of parallel pins 70, 70 are both respectively inserted into cam holes 71, 71 formed at opposing positions in the housing 11.

Figure 8:
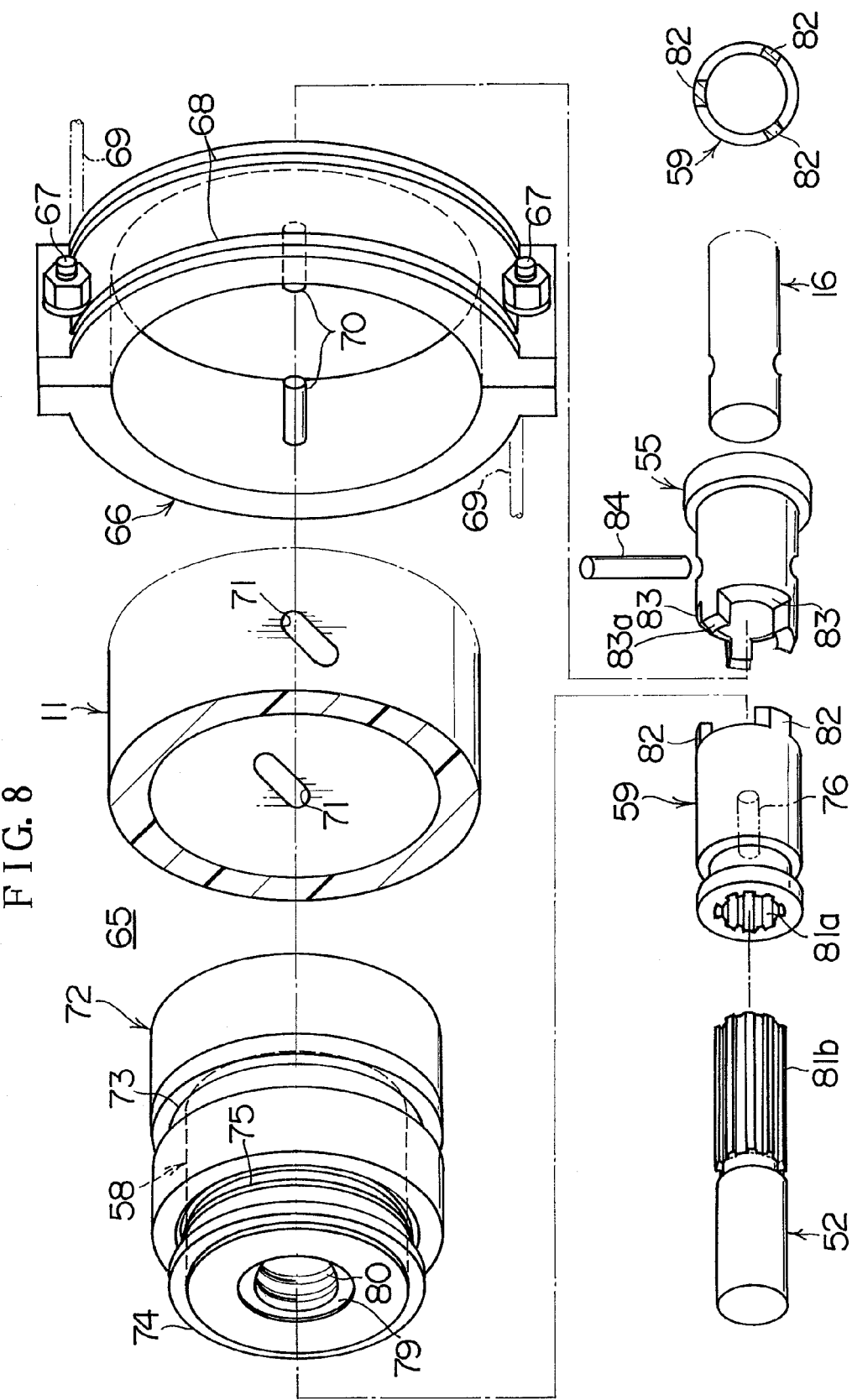
FIG. 8 is an exploded perspective view with a portion omitted showing the CPR mechanism.
Figure 9A:
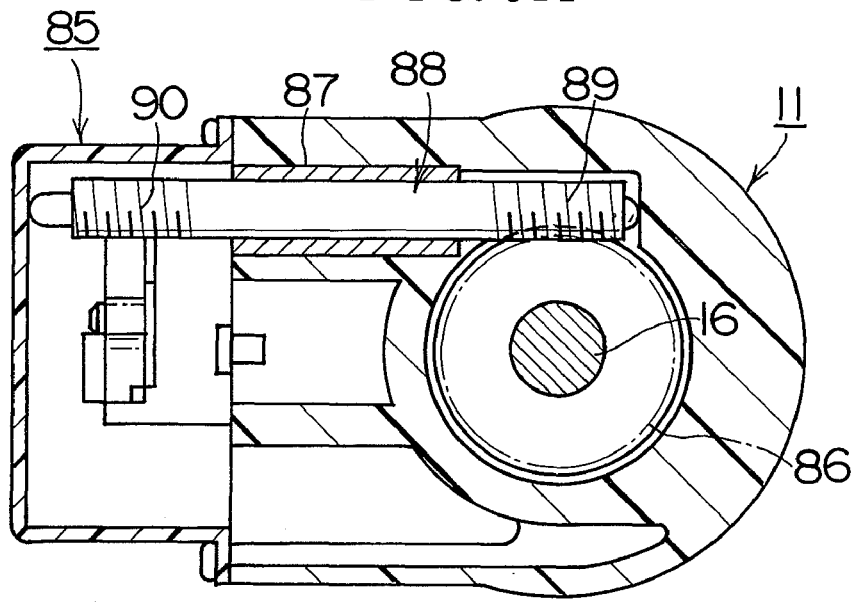
FIG. 9A is a side cross sectional view taken along the line IXa-IXa of FIG. 4A.
Figure 9B:
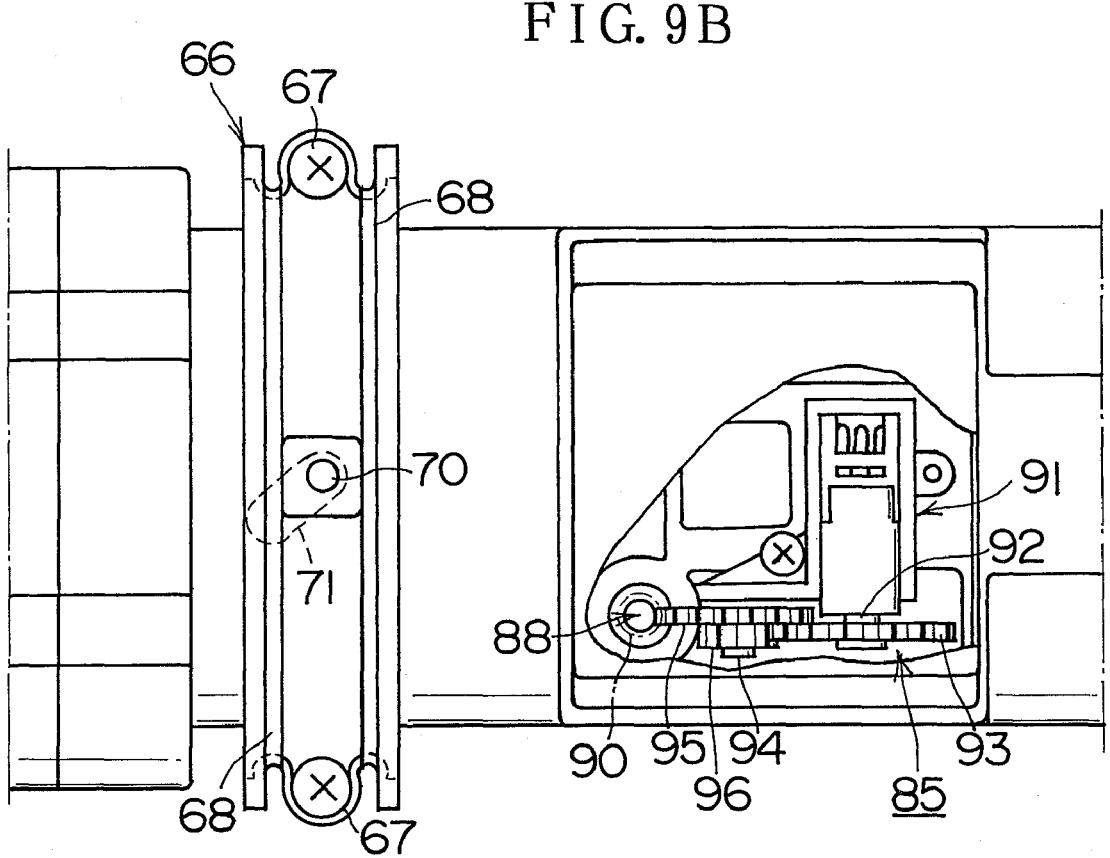
FIG. 9B is a fragmentary view as seen from the arrows along the line IXb-IXb of FIG. 3.

As shown in FIG. 8, both the cam holes 71, 71 are tilted versus the surface perpendicular to the axial center of the housing 11. Both the parallel pins 70, 70 therefore move axially by the follow-up of the cam holes 71, 71 accompanying the slide (rotation) towards the periphery of the operating ring 66.

A function ring 72 is installed within the one-way clutch mount section 56 in the housing 11. The function ring 72 converts the rotation of the operating ring 66 to an axial movement and transmits this movement to the inner race 59 serving as a clutch sleeve for the CPR mechanism 65. The function ring 72 is fitted to slide freely on the outer circumference of the outer race 58 of the one-way clutch 57.

A ring groove 73 is formed on the outer circumferential surface of the function ring 72. The tips of the pair of parallel pins 70, 70 respectively inserted through the cam holes 71 are inserted into the ring groove 73. The function ring 72 is shifted along the axis by the movement of the parallel pin 70 along the axis accompanying the rotation of the operating ring 66.

A spring sheet 74 is fitted on the end of the sub-housing 30 side on the outer circumference of the outer race 58. A return spring 75 is installed in a compressed state between the end surface on the sub-housing 30 side of the function ring 72 and the spring sheet 74. This return spring 75 continually applies a force on the function ring 72 towards the opposite side to the sub-housing 30.

A pair of engaging pins 76, 76 serving as engaging pins for the clutch of the CPR mechanism 65 are respectively provided protruding inwards along the radius in the function ring 72 at a position that will not cause interference with the rollers 60 of the one-way clutch 57. Both the engaging pins 76, 76 are respectively inserted into pair of through holes 77, 77 formed on the outer race 58 so as not to interfere with the rollers 60.

A ring groove 78 is formed on the outer circumferential surface of the inner race 59 of the one-way clutch 57. The tips of the pair of engaging pins 76, 76 inserted in the through holes 77 are respectively inserted in the ring groove 78. The axial movement of the function ring 72 slaved to the operating ring 66 makes the inner race 59 move along the axis by way of the engaging pins 76, 76 and the ring groove 78.

A spring sheet 79 is fitted on the end of the sub-housing 30 side on the inner circumference of the outer race 58. A return spring 80 is installed in a compressed state between the end surface of the sub-housing 30 side of the inner race 59 and the spring sheet 79. The return spring 80 continually applies a force on the inner race 59 towards the opposite side to the sub-housing 30.

The sub-shaft 52 and the shaft 16 are inserted from both ends in the inner circumference of the inner race 59. The sub-shaft 52 is coupled by a spline. Namely, a female spline 81a is formed on the inner circumference of the inner race 59; a male spline 81b is formed on the outer circumference of the sub-shaft 52; and the female spline 81a and the male spline 81b are fitted to slide freely along the axis. In other words, the inner race 59 is capable of sliding along the axis in a state where the rotation is stopped by the sub-shaft 52, and is able to slide freely along the axis and along the periphery of the shaft 16.

Three engaging male sections 82, 82, 82 are respectively formed in the same shape on the end surface of the shaft 16 side of the inner race 59. The three engaging male sections 82, 82, 82 are formed at positions at equidistant spaces, or in other words, at positions each 120 degrees apart from each other along the circumference.

The three engaging male sections 82, 82, 82 are structured to respectively engage and disengage with three engaging female sections 83, 83, 83 formed on the end surface of the sub-shaft 52 side of a collar 55 clamped to the shaft 16 by a pin 84. The three engaging female sections 83, 83, 83 are formed in the same shape, and are disposed at positions at equidistant spaces, or in other words at positions each 120 degrees apart from each other along the circumference.

The circumferential length of the engaging male section 82 is set shorter than the circumferential length of the engaging female section 83.

Setting the circumferential length of the engaging male section 82 as L1, and the circumferential length of the engaging female section 83 as L2, the circumferential length of the engaging male section 82 and the circumferential length of the engaging female section 83 are preferably set so as to satisfy the following formula.

$$L1/L2 \leq 1/2$$

The three engaging male sections 82, 82, 82 respectively enter from the sub-shaft 52 side to engage with the three engaging female sections 83, 83, 83, in a normal state where the inner race 59 is pressed back by the return spring 80. When the inner race 59 has been shifted along the axis by the axial movement of the function ring 72 slaved to the operating ring 66, the three engaging male sections 82, 82, 82 release the engaging by separating from the three engaging female sections 83, 83, 83 towards the sub-shaft 52 side.

The inner race 59 in other words acts as a clutch for engaging and disengaging the shaft 16 with the sub-shaft 52 serving as the input shaft.

In the CPR mechanism 65 structured as described above, when the bed is placed in a flat state for emergency cardiopulmonary resuscitation, either of the control wires 69 on the left or right of the bed 1 is pulled to rotate the operating ring 66 so that the function ring 72 resists the force of the return spring 75 and is shifted towards the sub-housing 30. This movement of the function ring 72 moves the inner race 59 towards the sub-housing 30, and shifting of the inner race 59 releases the engaging between the engaging female sections 83 and the engaging male sections 82, so that the engaging between the sub-shaft 52 and the shaft 16 can be swiftly released.

Releasing the engaging with the sub-shaft 52, allows the shaft 16 to rotate freely so that the bed-back 4 of the bed 1 can fall in emergencies.

A potentiosensor mount section 85 is provided at one flank on the side opposite the one-way clutch mount section 56 of the deep groove ball bearing 54 in the housing 11 as shown in FIG. 4A, FIG. 5A, FIG. 9A and FIG. 9B. A worm wheel 86 is fitted on the outer circumference of the shaft 16 in the potentiosensor mount section 85 to rotate along with the shaft 16.

A worm shaft 88 in the potentiosensor mount section 85 inside the housing 11 is placed in a direction perpendicular to the axial direction of the shaft 16, and is supported to allow free rotation by a slide bearing 87. A first worm 89 and a second worm 90 are respectively formed on both ends of the worm shaft 88. The first worm 89 engages with the worm wheel 86.

A potentiosensor 91 in the potentiosensor mount section 85 outside the housing 11 is installed so that a sensor shaft 92 of the potentiosensor 91 is perpendicular to the shaft 16 and the worm shaft 88. A driven gear 93 is clamped to the sensor shaft 92 to rotate along with the sensor shaft 92.

A reduction gear shaft 94 is affixed in parallel with and on one side of the potentiosensor 91 in the potentiosensor mount section 85. A large diameter reduction gear 95 and a small diameter reduction gear 96 are supported to allow free rotation together on the reduction gear shaft 94. The driven gear 93 engages with the small diameter reduction gear 96, and the second worm 90 engages with the large reduction gear 95.

The rotation of the shaft 16 is therefore transmitted to the sensor shaft 92 by way of the worm wheel 86, the first worm 89, the second worm 90, the large diameter reduction gear 95, the small diameter reduction gear 96, and the driven gear 93.

The potentiosensor 91 converts the rotation of the sensor shaft 92 to a linear motion, and also converts it to a voltage value.

The function and effect are described next.

The linear actuator 10 is pre-assembled into the bed 1 as shown in FIGS. 1A and 1B. Namely, the linear actuator 10 is supported on the frame 2 of the bed 1 to allow free rotation by the pivot 3 passing through the frame 2 of the bed 1 and passing through the coupling piece 32 of the linear actuator 10. The pivot 6 on the bed-back 4 side also passes through the coupling piece 25 on the moving cylinder 12 side of the linear actuator 10 so that the pivot 6 connects the linear actuator 10 to the bed-back 4 for free rotation.

After the linear actuator 10 has been assembled into the bed 1, the operator presses the operation button on the forward rotation side for raising the bed-back 4, so that the motor 40 rotates in the forward direction from the status shown in FIG. 1A, and the drive power of the rotating shaft 41 is transmitted to the sub-shaft 52 by way of the pair of worms 42, 43, worm wheels 46, 47, intermediate gears 48, 49 and the drive gear 50. The forward rotation of the sub-shaft 52 is transmitted to the shaft 16 by way of the engaging male sections 82 of the inner race 59 and the engaging female sections 83 of the shaft 16.

Only the shaft 16 rotates forward since the link between the one-way clutch 57 and the shaft 16 is released during forward rotation of this shaft 16. No braking force occurs at this time between the base plate 62 and the brake plate 63 fitted on the outer race 58 of the one-way clutch 57.

While the drive force of the rotating shaft 41 of the motor 40 is here being transmitted to the sub-shaft 52 or in other words the shaft 16, the torque from the rotating shaft 41 is divided into two portions by the pair of worm wheels 46, 47 so that the pair of worm wheels 46, 47 can be made to a small outer diameter.

Making the worm wheels to a smaller outer diameter allows making the linear actuator 10 smaller.

For example, a conventional design of a 10000N linear actuator possesses an outer diameter 110 millimeters. However, the linear actuator of this embodiment can be made to a diameter of 90 millimeters.

When the motor 40 rotates the shaft 16 forward, the nut 19 advances along the support cylinder 13 so that the moving cylinder 12 linked to the nut 19 is pushed outward from the support cylinder 13. The nut 19 at this time slides along the anti-rotation means 14 of the support cylinder 13 made of plastic.

The anti-rotation means mechanism prevents the moving cylinder 12 from rotating and the relative positions of the potentiosensor 91 and the moving cylinder 12 from deviating when there is no linear actuator 10 installed on the bed 1. However, when the linear actuator 10 is installed in the bed 1, then the moving cylinder 12 is clamped to the bed 1 so that no anti-rotation mechanism is needed.

The forward movement of the moving cylinder 12 raises the bed-back 4 of the bed 1 linked to the coupling piece 25 of the moving cylinder 12 as shown in FIG. 1B.

The forward rotation of the shaft 16 on the other hand is transmitted to the sensor shaft 92 after being slowed down by way of the first worm 89, second worm 90, large diameter reduction gear 95, small diameter reduction gear 96 and driven gear 93. The potentiosensor 91 converts the rotation speed of the sensor shaft 92 to a voltage value, and sends that voltage value to the controller (not shown in drawing) to control the operation of the bed 1.

The controller automatically stops the motor 40 when it detects a voltage potential matching the specified upper limit position.

The worm wheel 86 and the worm shaft 88 or in other words, the worm gear reduction device is here utilized for transmitting the rotation of the shaft 16 to the sensor shaft 92 of the potentiosensor 91, so that the potentiosensor 91 can be installed at a position separate from the shaft 16, and a greater degree of freedom obtained for setting the position of the potentiosensor 91.

Moreover, a large speed reducing ratio can be set by utilizing the worm gear reduction device so that the large diameter reduction gear 95, small diameter reduction gear 96 and driven gear 93 need not be set to a large speed reducing ratio.

The second worm 90 on the worm shaft 88 may be substituted for the large diameter reduction gear 95 and the intermediate gears, etc.

When operation of the motor 40 stops, the load (body weight of patient, etc.) on the bed-back 4 of the bed 1 is applied to the nut 19, and acts as a force making the nut 19 retreat by way of the moving cylinder 12 so that the load side reverse rotation force causing reverse rotation from the moving cylinder 12 or in other words, the load side, is applied to the shaft 16 by the action of the female screw section 18 of the nut 19 and the feed male screw section 17 of the shaft 16.

This load side reverse rotation force acts to link the shaft 16 with the outer race 58 so that the mating surfaces of the base plate 62 and the brake plate 63 fitted on the outer race 58 of the one-way clutch 57, act to form a braking surface that prevents reverse rotation of the shaft 16. The linear actuator 10 can therefore support the weight of the bed-back 4 while staying in a raised state.

When the operator 4 next pushes the operation button on the reverse rotation side to fall the bed-back 4, the motor 40 rotates in reverse, so that the reverse rotation drive force of the rotation shaft 41 is transmitted to the sub-shaft 52 by way of the pair of worms 42, 43, worm wheels 46, 47, intermediate gears 48, 49 and the drive gear 50. The reverse rotation of the sub-shaft 52 is transmitted to the shaft 16 by way of the engaging male sections 82 of the inner race 59 and the engaging female sections 83 of the shaft 16.

The nut 19 retreats along the support cylinder 13 when the motor 40 rotates the shaft 16 in reverse so that the moving cylinder 12 linked to the nut 19 is pulled into the support cylinder 13. The bed-back 4 of the bed 1 linked to the coupling piece 25 of the moving cylinder 12 falls by retreating of the moving cylinder 12.

The outer race 58 and the inner race 59 of the one-way clutch 57 are linked at this time by the roller 60 by reverse rotation of the shaft 16, but the braking force between the brake plate 63 and the outer race 58 is set lower than the drive force on the shaft 16 of the motor 40 so that the one-way clutch 57 is idle relative to the housing 11 to allow the shaft 16 to rotate in reverse relative to the housing 11.

The shaft 16 in other words, rotates in reverse relative to the housing 11 to make the nut 19 retreat along the support cylinder 13 so that the moving cylinder 12 linked to the nut 19 is pulled to the support cylinder 13 to fall the bed-back 4 of the bed 1 linked to the coupling piece 25 of the moving cylinder 12.

The reverse rotation of the shaft 16 on the other hand is transmitted to the sensor shaft 92 after being slowed down by way of the first worm 89, second worm 90, large diameter reduction gear 95, small diameter reduction gear 96 and driven gear 93. The potentiosensor 91 converts the rotation speed of the sensor shaft 92 to a voltage value, and sends that voltage value to the controller (not shown in drawing) to control the operation of the bed 1.

The controller automatically stops the motor 40 when it detects a potential voltage matching the specified lower limit position.

When operation of the motor 40 stops, the frame 2 of the bed 1 mechanically supports the load (body weight of patient, etc.) of the bed-back 4 so that there is no force acting to retreat the nut 19 on the moving cylinder 12, and therefore there is no load side reverse rotation force acting on the shaft 16.

The above described effect prevents the shaft 16 from rotating in reverse even if a load side reverse rotation force is constantly applied to the shaft 16 in a state where the bed-back 4 is fell.

Figure 10A:
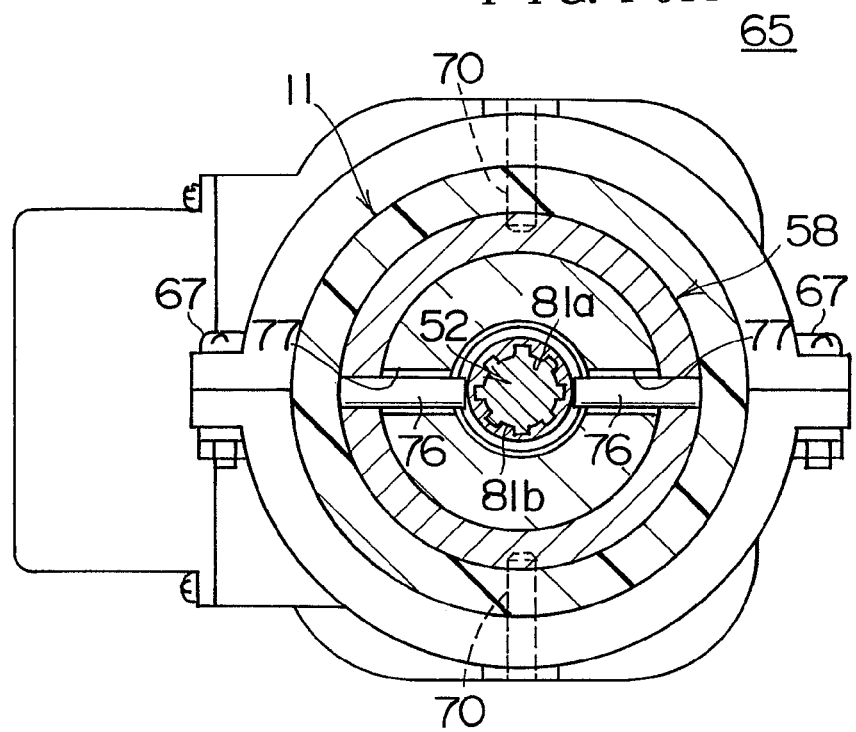
FIGS. 10A and 10B are drawings showing the CPR mechanism operation in emergencies.
Figure 10B:
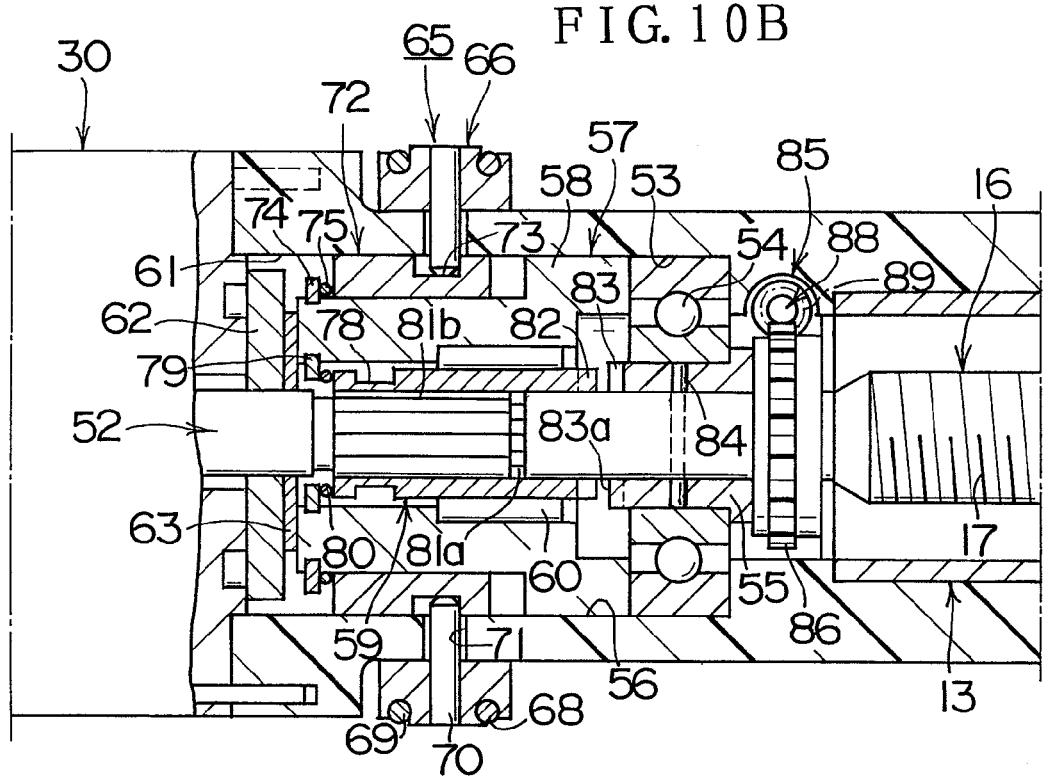

The operation of the CPR mechanism 65 in emergencies is described while referring to FIGS. 10A and 10B.

When the bed-back 4 set to an erect position as shown in FIG. 1B is swiftly positioned in a flat state in an emergency for performing cardiopulmonary resuscitation, etc., either of the control wires 69 on the left or right of the bed 1 is pulled by using the operating lever, then the operating ring 66 is rotated as shown in FIG. 10A.

As shown in FIG. 10B, when the operating ring 66 is rotated, the function ring 72 is shifted towards the sub-housing 30 while resisting the force of the return spring 75. Shifting this function ring 72 moves the inner race 59 towards the sub-housing 30.

The shifting of the inner race 59 releases each of the engaging male sections 82 from each of the engaging female sections 83 so that the link between the sub-shaft 52 and the shaft 16 is released by the release of each engaging female section 83.

Releasing the link between the shaft 16 and the sub-shaft 52, sets a state that allows the shaft 16 to rotate freely on the inner circumference of the inner race 59.

In this state, the weight (weight of the patient, etc.) of the bed-back 4 of the bed 1 is applied to the nut 19 by way of the moving cylinder 21 as a force making the nut 19 retreat so that the load side reverse rotation force causing reverse rotation from the moving cylinder 21 or in other words, the load side, is applied to the shaft 16 by the action of the female screw section 18 of the nut 19 and the feed male screw section 17 of the shaft 16.

This load side reverse rotation force causes the shaft 16 to rotate in reverse on the inner circumference of the inner race 59 so that the bed-back 4 can fall flat due to its own weight.

Pulling the operating lever of the CPR mechanism 65 immediately lowers the bed-back 4. However, when the operating lever is released during use, the bed-back 4 must immediately stop at that position. The CPR mechanism 65 must in other words automatically return to its former state when the operating lever is released, and must return to a state where the usual raising and falling operation for the bed can be maintained.

In this embodiment, the three engaging male sections 82 and the three engaging female sections 83 control the engaging and disengaging of the inner race 59 on the sub-shaft 52 side and the collar 55 on the shaft 16 side, so that the bed will definitely return to its former position even if the operating lever of the CPR mechanism 65 is released during its use.

The engaging and disengaging operation by the engaging male sections and engaging female sections is described next while referring to FIGS. 11A-11D.

During the normal raising and falling operation of the bed, the engaging female sections 83 of the collar 55 and the engaging male sections 82 of the inner race 59 mutually engage as shown in FIG. 11A.

The solid arrow A1 in FIG. 11A indicates the direction that the inner race 59 rotates when the bed is rising. The broken line arrow A2 indicates the direction of the load side reverse rotation force.

Pulling the operating lever of the CPR mechanism 65, shifts the inner race 59 via the CPR mechanism 65 in the direction as shown by the arrow A3 in FIG. 11B, and releases the engaging between the engaging male sections 82 and the engaging female sections 83, so that the collar 55 or in other words the shaft 16 is rotated in the direction of the load side reverse rotation force shown by the arrow A2.

If the operating lever of the CPR mechanism 65 is released before the bed-back 4 reaches the lower limit, then the inner race 59 is moved by the CPR mechanism 65 in the direction shown by the arrow A4 in FIG. 11C so that the engaging male sections 82 are returned to the former engaging position with the engaging female sections 83.

Though slight, as shown in FIG. 11C, there is the possibility that the engaging male sections 82 might strike the partition wall section 83a between the adjacent engaging female sections 83, 83 at this time.

In this embodiment, the circumferential length of the engaging male sections 82 is set shorter than the circumferential length of the engaging female sections 83, and the load side reverse rotation force rotates the collar 55 at high speed in the direction shown by the arrow A2, so that the engaging male sections 82 drop relatively into the engaging female sections 83 as shown in FIG. 11D, resulting in the engaging male sections 82 definitely returning to the former engaging position with the engaging female sections 83 even if the engaging male sections 82 strike the partition wall sections 83a.

The embodiment is capable of rendering the following effects.

1) The correct operation of the linear actuator can be ensured and normal usage as a bed can be achieved since the engaging of the clutch during normal usage of the bed allows reliably transmitting the driving power of the motor to the moving cylinder 12 by way of a clutch (CPR mechanism) for engaging and disengaging the sub-shaft 52 and the shaft 16 that is installed between the sub-shaft 52 to which the rotation of the motor is transmitted and the shaft 16 on which the nut 19 is screw-coupled for advancing and retreating the moving cylinder 12.

2) In emergencies such as at cardio-pulmonary resuscitation, the bed-back 4 of the bed 1 can swiftly fall flat by its own weight since the shaft 16 can swiftly shift to a free rotation state by disengaging the clutch (CPR mechanism).

3) The bed can be prevented from unintentionally going to a horizontal position because the clutch cannot be easily disengaged even if an external force is applied to the operating lever or wire by mistake, since a structure is utilized where along with including the operating ring 66 fitted to rotate freely on the outer circumference of the housing 11, and the function ring 72 for converting the rotation of the operating ring 66 to an axial movement and transmitting this motion to the clutch (CPR mechanism), the function ring converts the rotation of the operating ring to a linear motion, and the clutch then disengages the engaging between the sub-shaft 52 and the shaft 16.

Operation is simple and reliable since the force of the operating lever can be transmitted without changing the direction of that force.

4) The engaging male sections 82 and the engaging female sections 83 can return to their former engaging position even if the operating lever of the CPR mechanism 65 is released during use, because the engaging and disengaging of the inner race 59 on the sub-shaft 52 side with the collar 55 of the shaft 16 side can be controlled by the engaging male sections 82 and the engaging female sections 83, by forming the engaging male sections 82 on the inner race 59 on the sub-shaft 52 side, and forming the engaging female sections 83 on the collar 55 of the shaft 16 side, and setting the circumferential length of the engaging male sections 82 shorter than the circumferential length of the engaging female sections 83.

5) The bed-back 4 of the bed can promptly and moreover correctly stop at the specified position by releasing the operating lever, because the engaging male sections 82 can reliably return to their former engaging position with the engaging female sections 83, even if the operating lever of the CPR mechanism 65 is released during use.

6) The stroke of the clutch for engaging and disengaging the sub-shaft 52 with the shaft 16 can be shortened since the engaging male sections 82 can be made to reliably engage and disengage with the engaging female sections 83 even if the engaging male sections 82 are set to a low height, by forming the engaging male sections 82 on the inner race 59 on the sub-shaft 52 side, and forming the engaging female sections 83 on the collar 55 on the shaft 16 side, and setting the circumferential length of the engaging male sections 82 shorter than the circumferential length of the engaging female sections 83.

7) The reliability of the clutch for engaging and disengaging the sub-shaft 52 with the shaft 16 can be improved because the engaging male sections 82 can be made to reliably engage and disengage with the engaging female sections 83, by forming the engaging male sections 82 on the inner race 59 on the sub-shaft 52 side, and forming the engaging female sections 83 on the collar 55 on the shaft 16 side, and setting the circumferential length of the engaging male sections 82 shorter than the circumferential length of the engaging female sections 83.

The present invention is not limited by the above described embodiments, and needless to say various adaptations and modifications not departing from the spirit and scope of the present invention are allowed.

The present invention is not limited to forming three each of the engaging male sections and engaging female sections, and for example four or more through six or less each of these engaging male sections and engaging female sections may be formed.

The multiple engaging male sections and engaging female sections are in that case preferably arranged in rotation symmetry positions in order to prevent the engaging male sections from butting against the divider walls between the engaging female sections.

The above embodiments described raising and falling the back section of the bed, however, the linear actuator of this invention may be structured so as to raise and lower the bed.

If utilizing the above structure to raise and lower the bed, then the invention can render the effect of promptly lowering the bed in emergencies.

The above embodiments described utilizing the linear actuator for nursing or medical treatment sick beds, however, the actuator of this invention is not limited to those beds and may be applied to applications such as automotive electrical products.

The invention claimed is:

1. A linear actuator comprising
a housing supporting a shaft with a male screw section to allow free rotation,
a female screw member that is coupled by a screw to the male screw section and advances or retreats by the forward rotation of the shaft with the male screw section and advances or retreats by the reverse rotation of the shaft with the male screw section,
a moving cylinder that is fixed to the female screw member and advances and retreats relative to the housing,
an input shaft for transmitting the rotation of a motor to the shaft with the male screw section,
a clutch for engaging and disengaging the input shaft and the shaft with the male screw section,
an operating member fitted on an outer circumference of the housing,
a cam hole formed in the housing,
a pin provided in the operating member and inserted into the cam hole, and
a function ring having a ring groove for inserting the pin on the outer circumference and being capable of shifting along the axis by a movement of the operating member; wherein
the clutch includes a sleeve fitted to slide freely on the input shaft by an axial movement of the function ring,
engaging male sections respectively formed at positions apart from each other along the circumference on the end surface of the input shaft, and
engaging female sections respectively formed at positions apart from each other along the circumference on the end surface of the shaft with the male screw section to engage and disengage the engaging male sections.

2. The linear actuator according to claim 1, wherein the circumferential length of the engaging male sections is set shorter than the circumferential length of the engaging female sections.

3. The linear actuator according to claim 1 or claim 2, wherein from three to six engaging male sections and engaging female sections each are formed.

4. The linear actuator according to claim 1 or claim 2, wherein the engaging male sections and the engaging female sections are arranged in rotation symmetry positions.

5. A linear actuator according to claim 1, wherein a worm reduction gear reduces and transmits the rotation of a motor to the input shaft, a pair of worm wheels engage with a worm shaft of the worm reduction gear, and the rotation of both the worm wheels is transmitted to the input shaft.

6. The linear actuator according to claim 5, wherein the axial center of the input shaft is positioned perpendicular to the worm shaft.

7. The linear actuator according to claim 5, wherein the motor is installed at the flank of the input shaft end.

8. A linear actuator according to claim 1 or claim 2, wherein the operating member is an operating ring fitted to allow free rotation on an outer circumference of the housing, and the function ring converts the rotation of the operating ring to an axial movement and transmits the axial movement to the clutch.

9. A linear actuator according to claim 1 or claim 2, wherein a return spring continually applies a force on the sleeve towards the shaft with the male screw section.

10. A linear actuator according to claim 1 or claim 2, wherein a return spring continually applies a force on the function ring towards the shaft with the male screw section.

* * * * *